Aug. 23, 1932.                W. E. URSCHEL                1,873,681
                                BEAN PICKER
                      Filed April 24, 1929      3 Sheets-Sheet 1
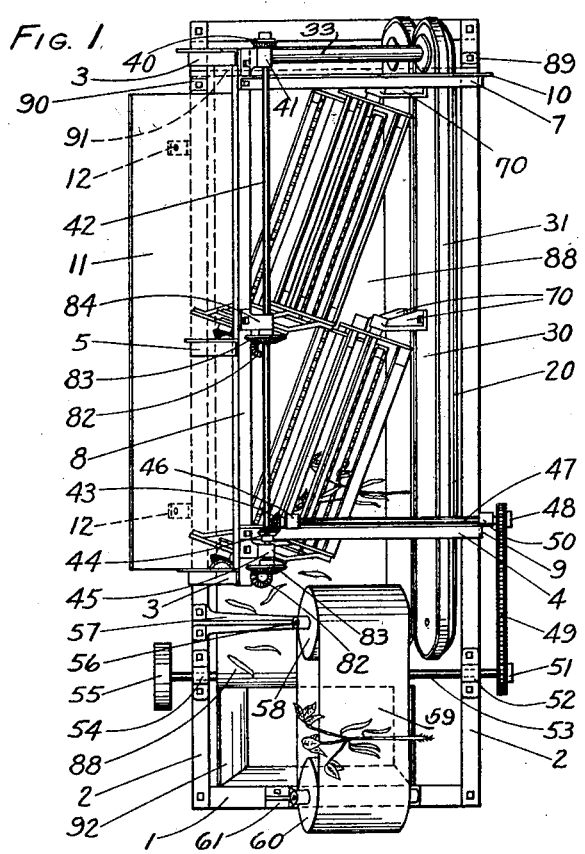
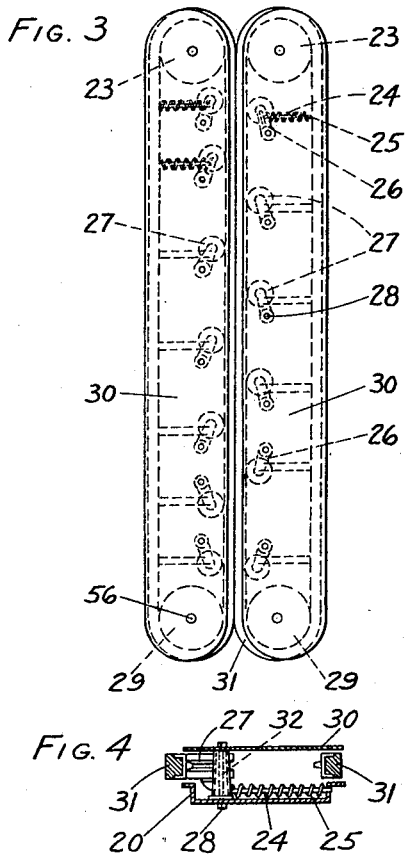
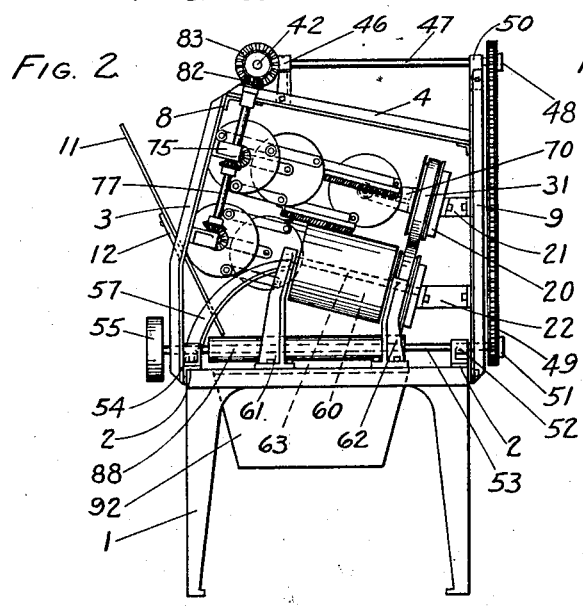
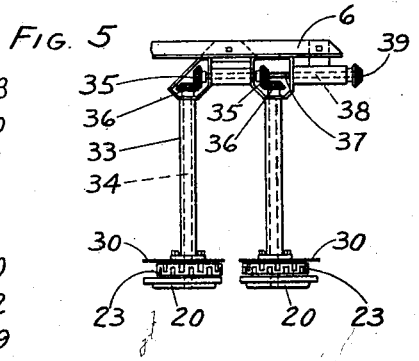
INVENTOR.
William E. Urschel
BY
ATTORNEY Aug. 23, 1932.  W. E. URSCHEL  1,873,681
BEAN PICKER
Filed April 24, 1929  3 Sheets-Sheet 2
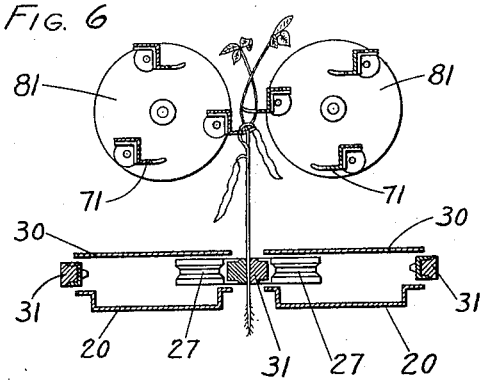
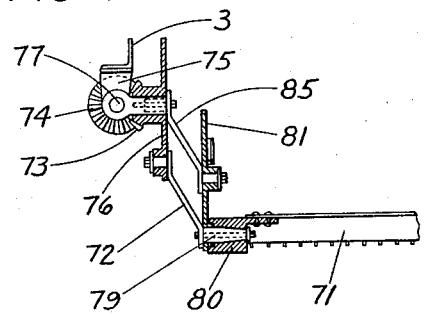
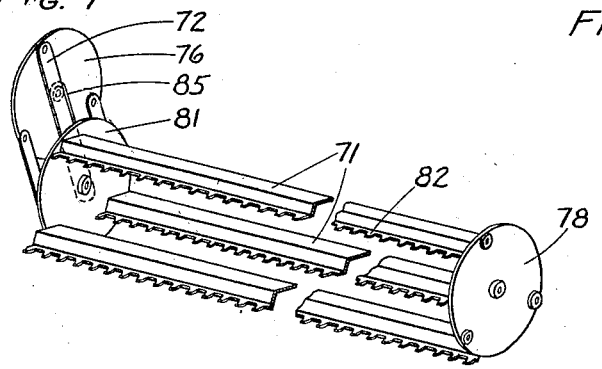
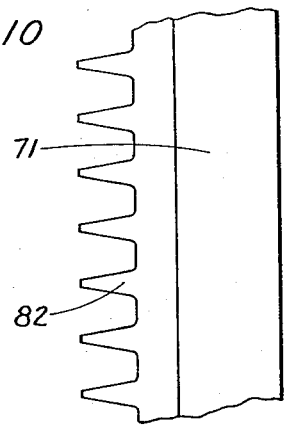
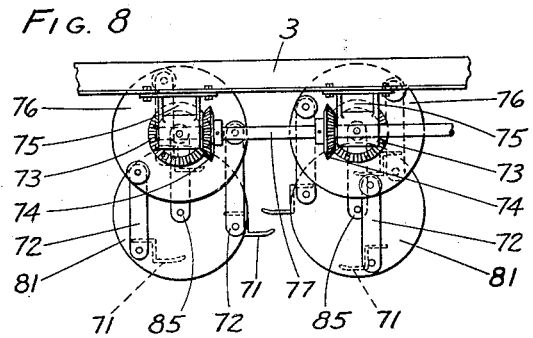
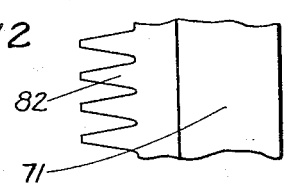
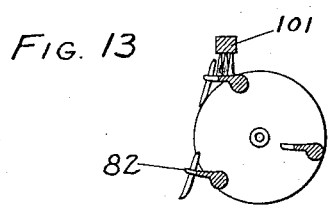
INVENTOR.
William E Urschel
BY
ATTORNEY Patented Aug. 23, 1932

1,873,681

UNITED STATES PATENT OFFICE

WILLIAM E. URSCHEL, OF VALPARAISO, INDIANA

BEAN PICKER

Application filed April 24, 1929. Serial No. 357,624.

The present invention relates to a bean picker and has to do with a device adapted to separate the bean pods from bean stalks and to subsequently discharge the denuded bean stalks from the device at one part thereof and collect the bean pods at another part thereof.

The difficulties hardest to overcome in bean picking have been the picking of the pods without injuring them for they are very tender, the picking of the pods without pulling the bushes from the holding mechanism, and the preventing of the choking of the pickers with the vines or bushes. All of these difficulties have been surmounted in the present invention.

Included in the objects of the invention, among others, are the following:

A new and novel means for conveying harvested stalks to a position from whence the pods thereon may be removed.

A new and novel means for removing the pods from the harvested stalks and which is adapted to hook or rake the stalks in an upwardly direction beginning at the top thereof, and moving downwardly until the stalk for its entire length has been completely raked, after which the stalks are again raked their length whereby to insure the removal therefrom of all bean pods.

These, and such other objects as may hereinafter appear, are obtained by the novel construction, combination and arrangement of the several elements which constitute the invention, one embodiment of which is illustrated in the accompanying three sheets of drawings, hereby made a part of this specification, and in which Figure 1 is a top plan or view of a bean picker, embodying the subject matter of the present invention.

Figure 2 is a front end view of the device illustrated in Figure 1.

Figure 3 is a plan view of the stalk carrier and frame;

Figure 4 is a transverse section or one of the stalk carrier frames.

Figure 5 is a front view of the stalk carrier arch support;

Figure 6 is a schematic detail, in section, of the pickers and the stalk carrier;

Figure 7 is a fragmentary perspective view of one of the front section of pickers;

Figure 8 is an elevation of the drive end of the pickers;

Figure 9 is a detail, partly in section, of the driven end of the pickers;

Figure 10 is an enlarged fragmentary plan view of the picker fingers of the front section of pickers.

Figure 11 is an enlarged transverse section through a picker finger;

Figure 12 is an enlarged fragmentary plan view of the picker fingers of the rear section of pickers;

Figure 13 is a detail in section of a cleaner device for the picker fingers.

Like reference characters are used to designate similar parts in the drawings and in the description of the invention.

Figure 14:
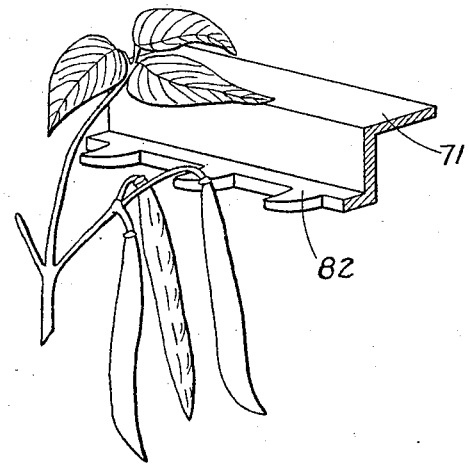
Figures 14, 15, 16, 17, 18 and 19 are fragmentary diagrammatical views of the picker fingers showing their action, all of these, except Figures 17 and 18 which are plan views, being in perspective.

Reference should be had to Figures 1 and 2. The frame of the device comprises two legged transverse standards 1 secured together by two longitudinally extending frame members 2.

Mounted on the right side of the machine (Figures 1 and 2) are two oppositely disposed stalk carrier frames 20 held in spaced relation at the feed or forward end of the device by brackets 21 and 22 which are securely fixed to an upright frame member 9. The rear or discharge end of the stalk carrier frames 20 is supported on a vertical frame member 10 by brackets similar to brackets 21 and 22 (not shown).

A bearing bracket 33, (Figure 4), secured to the stalk carrier frame 20 and to a frame member 3 provides bearings for shafts 34 to which carrier chain drive sprockets 23 are secured. Gears 36 fixed to shafts 34 are driven by gears 35 secured to shaft 38 which is journaled in bearing bracket 33.

Gear 39 secured to shaft 38 is driven by a gear 40 which is fixed to a shaft 42. Shaft 42 is journaled in bearing brackets 41 and 45 which are mounted on an upper longitudinal frame member 8.

Gear 44 secured to a shaft 42 is driven by a gear 43 which is securely fastened to a shaft 47. Said shaft 47 is mounted in a bearing bracket 46, which is secured to a transverse frame member 4 and in a bearing bracket 50 which is mounted on said upright frame member 9.

Sprocket 48 is secured to said shaft 47 and is driven by sprocket 51 through a chain 49. Sprocket 51 is secured to shaft 53 which is journaled in bearings 52 and 54 which are mounted on the longitudinal frame members 2.

Pulley 55 is secured to said shaft 53 and is driven by a belt (not shown) from a suitable source of power supply, also not shown.

The feed end of the carrier frames 20 are provided with idler wheels 29. A carrier chain 31 on each frame is pressed outwardly by a plurality of spring pressed idler rollers 27 which are rotatably journaled on pivoted arms 26.

Each of said pivoted arms 26 is pressed outwardly by a compression spring 24 mounted on a rod 25. One end of said rod is mounted reciprocally adjacent to the free end of the pivoted arms 26, and the other end is secured in the stalk carrier frame 20. The springs 24 exert a resilient tension to force the idler rollers 27 outwardly in engagement with the chain 31 to provide sufficient tension in the abutting portions of opposite chains to cause them to grip and convey the bean stalk in a firm manner while the pods are being removed.

The stalk carrier frame is covered by a top plate 30 which is secured by bolts 28 passing through spindles 32 on which the arms 26 are mounted.

Mounted in front of the stalk carrier is a feeder belt 59 positioned in such a manner that bean stalks laid upon the feed belt 59, are conveyed to the stalk carrier in such position that the root portion of the bean stalk may be grasped by the rubber tired carrier chains 31.

The drive roller 58 of the feeder belt 59 is secured to an extended idler pin 56 and is driven by said idler pin 56.

One end of said idler pin 56 is journaled in a stalk carrier frame 20 the other end is journaled in a bearing bracket 57 which is secured to one of the main frame members 2. The idler roller 60 is mounted on shaft 63 (Figure 2) which is journaled in the bearing brackets 61 and 62 which are secured to one of standards 1.

Mounted to the side of the stalk carrier are the pod pickers which are supported at one end by the upright frame members 3 and 5 and at the other end by brackets 70, mounted on the stalk carrier frame 20.

The pod pickers comprise two sections of paired members, a forward section and a rear section. Each section has two oppositely disposed revolving picker drums which have fingers adapted to hook under the stem of the bean pod and pull the pod loose from the bush.

Referring to Figures 8 and 9, it will be seen that the pickers are driven by shafts 77, to one end of which (Figure 1) is secured gears 82 driven by gears 83 mounted on said shaft 42.

Gears 74 (Figure 8) secured to said shafts 77 drive gears 73 which are secured to circular drive plates 76. Drive plates 76 are rotably mounted on bearing brackets 75 which also serves as bearings for said shafts 77.

A stationary central arm 85 is secured to the bearing projection on bracket 75 terminates in a stud on which end plates 81 are rotably mounted. The three arms 72 are mounted between the drive plate 76 and the end plate 81 by means of studs secured in said arms 72.

The picker fingers terminate with a knob 80 which is securely fastened to the arms 72 by a taper pin. The arms 72 will always remain in a position parallel with the central stationary arm 85 as the pickers revolve which will hold the picker fingers in a position best adapted to pick the pods from the stalks.

End plates 78 are rotably mounted on studs secured in brackets 70.

The pickers, which have a cross section as shown in Figure 11 consist of a strip 71 having a plurality of picking fingers on one edge having the turned up portion 82 which is adapted to hook under the stem of a bean pod as the picker fingers pass through a bean stalk.

Figure 15:
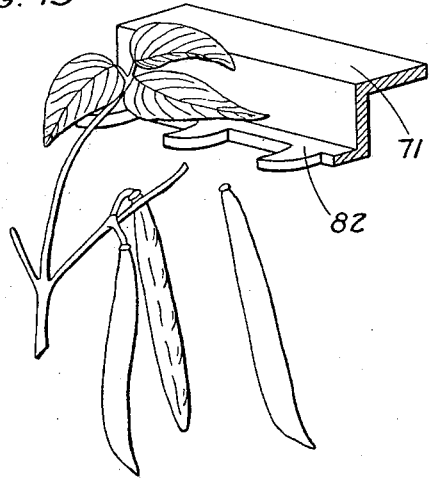

The fingers of the pickers move inwardly and upwardly through the bean stalk beginning at the top of the stalk and gradually working down to the bottom of the stalk. As the pickers pass through the stalk, the fingers of the pickers hook under the stem of the bean pod between the pod and the stalk and pull the pod free from the stalk as illustrated in Figures 14 and 15.

In these improved pickers, the picker fingers move inwardly and upwardly through the stalk always pointed in the same direction. When the picker fingers back away from the bean stalk they are still pointed in the same direction which allows any of the stalk to slide off of the pickers.

By this construction the bean stalk will not wrap around the pickers. If picker fingers were used which were fixed in a radial direction from the center line of the picker drum, the picker fingers tend to hook the bean stalks and to pull them around the picker drum.

While these improved pickers are practically self cleaning at speeds around eight feet per second, it may sometimes be desirable to mount a cleaning brush 101 over the pickers as is shown in Figure 13 whereby to adapt the pickers to a slower speed or to vining plants.

The stationary brush 101 is mounted so that when the pickers withdraw from the stalk the pickers move back against the bristles of the brush and any stalk or pod between the fingers will be removed. In early experiments, it was thought necessary to have cleaner brushes but field tests have proved that cleaner brushes were unnecessary when the pickers were operated at a high rate of speed but not at a speed great enough to mutilate the bean pods, say about eight feet a second.

Figure 17:
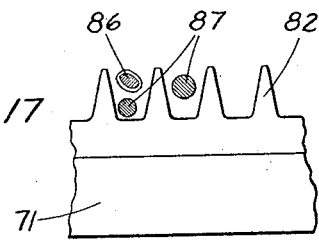

The forward section of pickers act as hooks due to the width of the space between the picker fingers as shown in Figure 10. The plants slip therebetween readily. Figure 17 illustrates the comparative size of the picker fingers 82, a bean pod 86 and bean stalks 87, the latter two being average sizes. The pickers so arranged will pass through the stalk without severely jerking the stalks or pulling them from the grip of the stalk carrier.

After the forward section of pickers have passed through the bean stalk, the greater part of the bean pods are pulled and the clusters of leaves and pods are broken up. It is then possible to have the rear section of pickers set closely enough together that a bean pod will not pass between the fingers.

Figure 18:
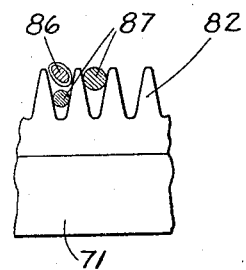
Figure 19:
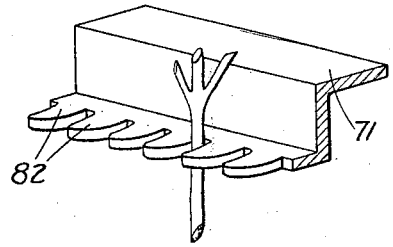

The comparative size of the picker fingers of the rear section of pickers, a bean pod 86, and stalks 87 is shown in Figure 18. Thus the remaining bean pods are combed from the bush. As the greater part of the bean pods are picked when the rear picker is reached, this picker will not pull the bean stalks from the grasp of the carrier unless the stalk gets between the puller teeth with a joint above the pickers as illustrated in Figure 19. As this but seldom happens and not until the stalk is usually stripped of its pods, it will not affect the performance of the machine to a noticeable extent.

Figure 16:
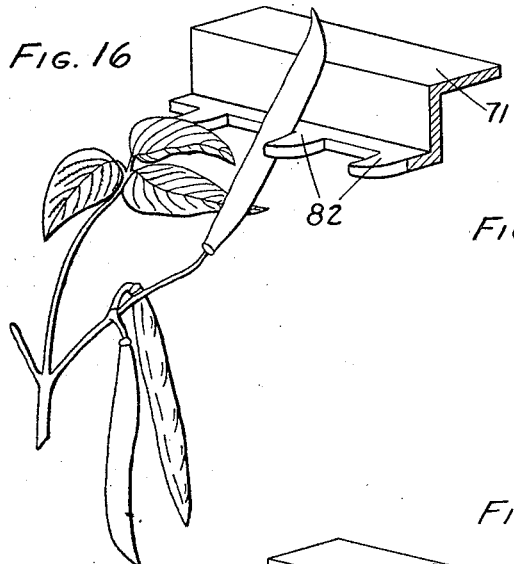

The speed at which the pickers travel is of great importance. Experience has shown that a picker speed of about eight feet per second is desirable for average beans. When the picker fingers hook beneath the stem of the bean pod as shown in Figure 14 while traveling at this speed the inertia of the bean pod causes it to resist the motion of the pickers, thus breaking the stem of the pod free from the stalk. At a slower speed the bean pod is liable to slide over the picker fingers as shown in Figure 16.

At a higher speed the pickers act as beaters or threshers and greatly damage the bean pods which is undesirable. The speed of the picker, however, may be varied to advantage, to suit the character of the bean, as a tender bean is more easily picked than a tough bean, thus a slower picker speed may be used.

A shield 11, supported on main frame member 2 by brackets 12 deflects the bean pods on to a conveyer belt 88.

The drive roller of said conveyer belt 88 is secured to shaft 53. The idler roller is secured to shaft 91, which is journaled in bearings 89 and 90, mounted on the main frame members 2.

*Operation of bean picker*

The bean stalks are pulled in the field and brought to the bean harvester. The individual bean stalks are laid upon the feeder belt 59 with the roots projecting to the right (Figure 1). The feeder belt carries the stalks to the stalk carrier by which their roots are grasped by the oppositely disposed carrier chains 31. As the bean stalks are conveyed rearwardly, the picker fingers of the front section of pickers pass through the top of the stalk and gradually work down until the complete stalk is raked or combed.

As the front section of pickers reach the bottom of the stalk, the rear section of pickers begin to recomb the bush at the top and gradually work down until the entire stalk has been recombed. As the rear section of pickers finish combing the plant, the denuded stalks are discharged at the rear end of the machine.

As the pods are pulled from the stalk, they fall upon the conveyer belt 88 and are carried to the front of the machine. A shield 11 of sheet metal guides the bean pods on the conveyer belt which discharges the pods into a hopper 92. Said hopper guides the beans into any suitable container beneath the mouth thereof.

This application is a continuation in part of an application, Serial No. 102,113, filed April 15, 1926, and entitled Bean harvester, such application also having been filed in the name of the applicant, William E. Urschel.

I claim:

1. A bean picker comprising means for moving bean stalks in a linear path, and picking means comprising oppositely rotated members having an axis of rotation oblique to said linear path and cooperating one with another to pull the pods from said stalks while so moved.

2. A bean picker comprising holding means for bean stalks, and oppositely rotating members in juxtaposition to one another revolving upon parallel axes oblique to the direction of such stalks and adapted to cooperate to pull the pods from said stalks in said holding means.

3. A bean picker comprising means for holding bean plants and for moving the plants longitudinally and transversely of a picking mechanism, and picking means comprising oppositely rotated members having axes of rotation oblique to the length of such plants and cooperating one with another to pull the pods from said plants while in said holding means.

4. A bean picker comprising conveying means for bean plants and adapted to move the plants axially and normally to picking members, and oppositely rotating picking members arranged in parallelism and having axes oblique to the direction of travel and conveying means and in juxtaposition to one another and adapted to pull the pods from said plants while being so conveyed.

5. A bean picker comprising teethed plates for pulling the beans from the stalks, and means for maintaining said plates in a single plane at all times.

6. In a bean picker, means for pulling the beans from the stalks comprising a plurality of plates having teeth and adapted to pass through the bean plants at a uniform angle relative thereto.

7. In a bean picker, means for pulling the beans from the stalks comprising a plurality of plates having teeth, and means for moving said plates through said plants in seriatim and with said plates normal thereto.

8. In a bean picker, means for pulling the beans from the stalks, comprising a plurality of toothed members arranged in series, and means for moving said members toward and away from and longitudinally of said stalks while maintaining said members normal thereto.

9. A bean picker having means for holding bean stalks, and pod picking means comprising a rotatable member having a toothed part and means for moving said toothed part eccentrically to said rotatable member.

10. A bean picker having means for holding bean stalks, and picking means comprising oppositely rotated members having movable toothed section, and means for maintaining said teeth in a single plane.

11. A bean picker having holding means for bean stalks, and oppositely rotating members in juxtaposition to one another and adapted to cooperate to pull the pods from the stalks, each of said members having toothed plates mounted peripherally thereof, and means for maintaining said plates in the same plane.

12. A process of picking beans from bean plants which comprises the steps of moving bean plants along a linear path, combing said plants at a speed less than required for threshing but sufficient to snap the pods from the stalks, and subsequently more closely combing said plants at substantially the same speed.

13. Means for removing bean pods from bean plants comprising a series of toothed plates, arranged obliquely of the length of the bean stalks an instrumentality for moving said plates through the bean plants in a plane normal to the stalks of said plants, and a device for moving said plates longitudinally and transversely of said plants.

WILLIAM E. URSCHEL.